R. W. G. STUTZKE.
PROCESS FOR THE MANUFACTURE OF STARCH PRODUCTS.
APPLICATION FILED AUG. 19, 1916.
1,320,719. Patented Nov. 4, 1919.
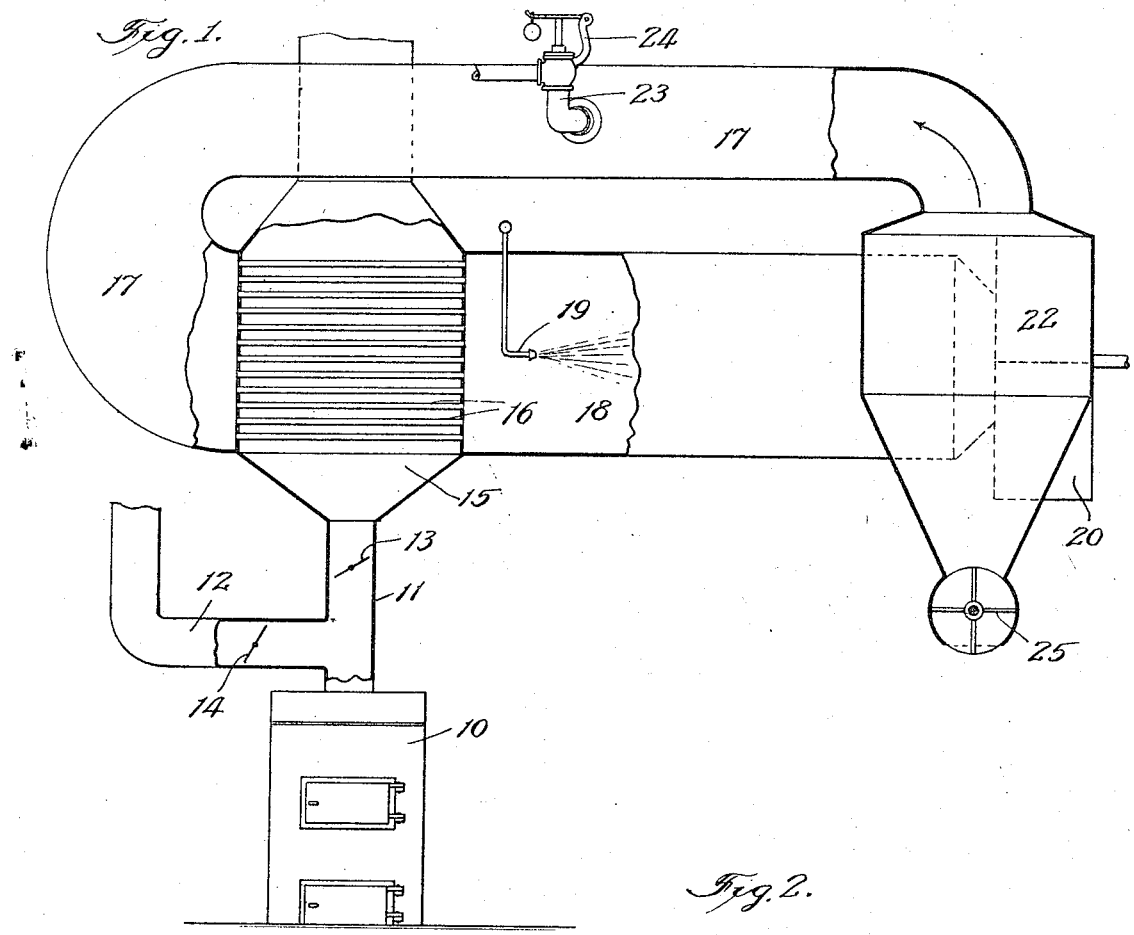
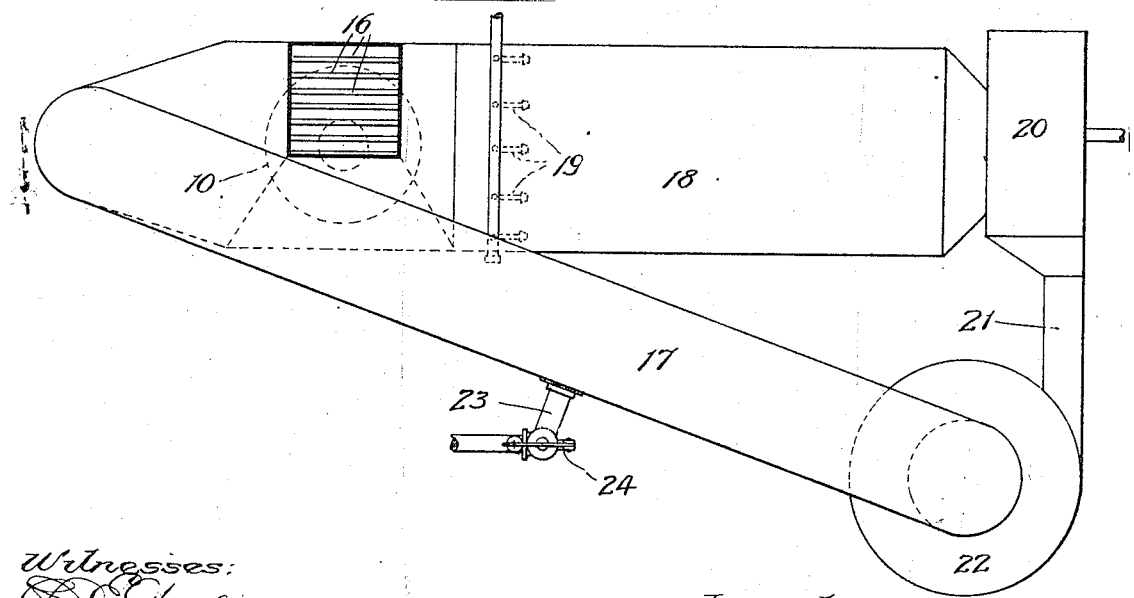

UNITED STATES PATENT OFFICE.

RICHARD W. G. STUTZKE, OF CHICAGO, ILLINOIS, ASSIGNOR, BY MESNE ASSIGNMENTS, TO THE G. A. BUHL COMPANY, OF CHICAGO, ILLINOIS, A CORPORATION OF ILLINOIS.

PROCESS FOR THE MANUFACTURE OF STARCH PRODUCTS.

1,320,719.

Specification of Letters Patent.   Patented Nov. 4, 1919.

Application filed August 19, 1916.   Serial No. 115,788.

*To all whom it may concern:*

Be it known that I, RICHARD W. G. STUTZKE, a citizen of the United States, residing at Chicago, in the county of Cook and State of Illinois, have invented a new and useful Improvement in Processes for the Manufacture of Starch Products, of which the following is a specification.

My invention relates to certain improvements in the art of manufacturing starch and starch products, such as dextrins. In brief, the improvements consist in subjecting a finely-divided liquid spray of a starch solution to the action of a heated gas, whereby the sprayed solution is dried and simultaneously subjected to regulated heat, the conditions of operation being such that it is possible to produce at will starch or a starch product having any desired characteristic. The invention will be more fully understood from the following detailed description, taken in connection with the accompanying drawings, in which—

Figure 1 is a diagrammatic elevation, partly in section, of an apparatus for treating starch according to my process; and Fig. 2 is a plan view of the same.

Referring more particularly to the drawing, the numeral 10 designates a suitable furnace or heater, and the numeral 11 designates the stack thereof through which the hot products of combustion pass upwardly. The stack 11 has tapped thereinto a conduit 12 which may vent directly to the atmosphere or may be tapped into the chimney beyond the drying and treating apparatus, as will later appear. The stack 11 and conduit 12 are each provided with dampers designated 13 and 14, respectively, by the proper adjustment of which the proportion of the products of combustion passing through each of these members may be adjusted to effect the necessary regulation of the temperature of the apparatus.

Directly above the stack 11 and forming a continuation thereof is a tubular heater 15, the tubes 16 of which extend transversely of the heater to form passages for the flow of the desiccating atmosphere, the exterior walls of the tubes being heated by the combustion gases of the furnace 10, while the interior walls transfer this heat to the desiccating atmosphere in its passage through the tubes. The tubes 16 constitute the connection between a return conduit 17 and drying chamber 18, the latter being of any desired cross-section and of sufficient length to accomplish the purpose for which it was intended. At the entrance end of the drying-chamber 18, that is, at the end adjacent the heater 15, there are provided spray-nozzles 19 through which the starch solution to be treated is introduced. The outlet end of the drying-chamber communicates with the central inlet of a centrifugal pump or blower 20, the tangential outlet of which, designated 21, enters a cyclone dust-collector 22. The upper central outlet of the dust-collector has connected therewith the return conduit 17, by which the gases are led to the entrance side of the heater 15. Intermediate the length of the return conduit 17 there is tapped thereinto a vent or relief-pipe 23 which may be equipped with an automatic pressure relief-valve 24 set to operate at any desired pressure. At the lower end of the cyclone collector 22 is a self-sealing dumping apparatus, which may be in the form of a four-armed dumping-gate 25, illustrated in Fig. 1.

In general, the operation of my apparatus is as follows: The solution to be dried is introduced into the drying-chamber 18, through the nozzles 19, the pressure being sufficient to secure an adequate atomizing effect. By the centrifugal pump 20 there is set up a continuous circulation through the apparatus in the direction indicated by the arrows therein, the circulating atmosphere being heated in its passage through the tubes 16 and giving up such heat to the spray issuing from the nozzles 19 to vaporize the liquid content of the spray and dry the solid matter contained therein. The air which is initially contained within the apparatus may be displaced by introducing pure water through the nozzles 19 for a short period of time, the volatilization of this water increasing the pressure within the apparatus and causing the excess gases to be vented through the conduit 23, either under pressure or at atmospheric pressure, as may be desired in any particular instance, and depending upon the setting of the valve 24. Whatever the condition of operation, it will be quite clear that by the constant venting of gas from the system the air contained therein will be displaced by steam, and in normal operation, therefore, the entire system will be filled with water-vapor or steam at the desired pressure. In its passage through the system, such vapor will be superheated in the tubes 16, the degree of superheat depending upon the firing of the furnace 10 and upon the regulation of the dampers 13 and 14. The superheated vapors issuing from the tube 16 will transfer some portion of their heat to the liquid spray issuing from the nozzle 19, thereby volatilizing the latter. The dried products will be carried along as a fine dust and deposited in the cyclone collector 22, from which they may be continuously removed by the dumping-gate 25.

The general form and manner of operation of the apparatus above described is not claimed herein, constituting, as it does, the subject matter of my prior application, Ser. No. 69,075. Attention is particularly directed, however, to the means for heating and controlling the temperature of the tubes 16, which constitutes a part of my present invention, not having been shown and described in my prior application referred to. The present invention is more especially concerned, however, with the utilization of the apparatus and general process above referred to in the treatment of starch and starch products. I find that if a solution, or, more properly, a mixture of commercial or merchant starch or green starch in the proportion for instance, of about one hundred pounds of dry starch to two hundred pounds of water, acidified with about twelve ounces of commercial hydrochloric or nitric acid, be sprayed from the nozzles 19 into a current of superheated steam of a temperature of about 250° F., a dry product consisting of white water-soluble dextrin, giving a violet coloration when tested with iodin, will be collected in the cyclone collector 22. The temperature of 250° F., above given is, it should be noted, the temperature at the entrance end of the drying-chamber 18. By the absorption of heat in the volatilization of the liquid of the solution, the temperature at the outlet end of the drying-chamber becomes reduced to approximately 220° F. For obtaining the best results in this method of drying and partially inverting or modifying the starch, it is important that the temperature should not at any place in the circulating system substantially exceed 500° F. In practice, I find it best to so operate the heater 15 as to keep the temperature of the internal walls of the heating-tubes 16 about 100° F. in excess of the desired maximum temperature of the desiccating atmosphere. If the tubes 16 are permitted to reach too high a temperature, that portion of the dried product which may escape collection in the cyclone 22 on its first passage therethrough will be charred or broken down in passing through the tubes 16, thereby choking up the latter and impairing the quality of the product. It is quite feasible, however, to operate under the conditions which I have described, maintaining the maximum temperature within the apparatus safely below the point at which injury to the product would occur.

By changing the running temperature of the apparatus, which may be readily effected, as above described, by regulation of the furnace 10, and more particularly by the dampers 13, 14, a variety of starch products ranging from the lowest dextrin or water-soluble starch up to the highest of the dextrins may be obtained. For instance, using the same solution as before named, and operating the desiccation system with a maximum temperature of 300° F. at the inlet end of the drying-chamber, and a minimum temperature of 250° F. at the oulet end of the chamber, I obtain a light canary-colored dextrin, giving a yellow coloration upon an iodin test. Similarly, by operating with a maximum temperature of 400° F. at the inlet end of the drum, and a minimum temperature of 350° F. at the outlet end of the drum, I obtain a pronounced yellow dextrin, giving a yellow-gray coloration under an iodin test.

By employing a solution of commercial starch or green starch without the addition of any acid, or with an exceedingly small percentage, (.2 per cent. acid) and operating at a temperature ranging from 280° F. at the inlet end of the drum to 230° F. at the outlet end, I obtain a starch product of the general nature of gelatinized or thin-boiling white starch which, when mixed with water, will make a thin paste, and which gives a blue coloration upon iodin test. Similarly, operating without acid, or with only a very small percentage of acid, and at a maximum and minimum temperature of 400° F. and 350° F., respectively, I obtain a yellow dextrin-like product which exhibits all the characteristics of the so-called "British gum" which is widely used in the fabric-printing arts.

The foregoing illustrations will, it is believed, be sufficient to make clear the general nature of the process and the manner of controlling the same for obtaining any desired starch product intermediate between semi-gelatinized or thin-boiling starch and the highest of the dextrins. Briefly, the use of acid in the solution accelerates the re-action and makes possible a greater inversion modification or change at lower temperatures. Quite satisfactory products of practically any desired character may be obtained, however, without the use of any acid but merely by the heating effect of the superheated steam. The use of an acid-free, or substantially acid-free, solution, seems to be particularly advantageous for producing the mixtures of starch and lower dextrins of the class of British gum.

It should be noted that by my process the products obtained are absolutely acid-free, even where a large proportion of acid is present in the solution which is treated. The temperature within the drying chamber may, and usually will, be considerably above the boiling point of the acids used, and the drying is so perfectly carried out by the action of the heated gas on the cloud of atomized liquid that no trace of acid remains in the collected product.

My process is particularly advantageous in that it is a continuous process, the material being subjected to treatment under easily regulated conditions and in relatively small quantities, and being continuously removed from the treating apparatus as the treatment is finished. It is well known that this is of the greatest importance, for the reason that, in the hitherto widely used non-continuous or batch processes, the utmost care must be used in bringing to a termination the treatment of each particular batch and cooling that batch at the exact moment when the desired degree of inversion has taken place, since very short delays frequently prove disastrous to the product.

As is well known, inversion under pressure is desirable in the production of many of the starch products, and this result may be obtained and the pressure easily controlled by my apparatus through the simple means shown. By the use of the continuously circulating desiccating atmosphere the utmost conservation of heat is effected, it being possible to thoroughly lag or jacket the entire system so that radiation losses may be reduced to the minimum, and outside of such losses, the sole consumption of heat in the apparatus is that required to continuously volatilize the water of the solution as it is sprayed in.

While I have shown and described in considerable detail one specific form of apparatus for carrying out my improved process, together with examples of the exact methods to be employed in obtaining certain particular results, it is to be understood that this showing and description is illustrative only and for the purpose of making clear the nature and objects of the invention, and that I do not regard the invention as limited to these details, nor to any of them, except in so far as I have included such limitations within the terms of the following claims, in which it is my intention to claim all novelty inherent in the invention as broadly as is permissible in view of the prior art.

What I claim as new and desire to secure by Letters Patent is—

1. The method of drying a starch solution and simultaneously effecting a predetermined modification thereof, which consists in subjecting such solution in finely divided form to the action of a current of gas capable of desiccating same and at a temperature capable of effecting the modification thereof and collecting the resultant dried and modified product.

2. The method of drying a starch solution and simultaneously effecting a predetermined modification thereof, which consists in subjecting such solution in finely divided form to the action of a current of superheated steam, and collecting the resultant dried and modified product.

3. The method of drying a starch solution and simultaneously effecting a predetermined modification thereof, which consists in subjecting such solution in finely-divided form to the action of a current of superheated steam of regulated temperature, thereby converting and drying the same, and collecting the resultant dried and modified product.

4. The method of producing dextrinous material from starch, which consists in spraying a solution of starch in water into a current of superheated steam of regulated temperature thereby drying and converting the same and collecting the resultant dry dextrin.

5. The method of producing dextrin from starch which consists in spraying an acidulated solution of starch in water into a current of superheated steam at a temperature of, at least, 250° F., thereby drying and converting the same and collecting the resultant dry dextrin.

6. The method of drying a starch solution and simultaneously effecting a modification thereof, which consists in spraying such solution into a regulated current of superheated steam, continuously circulating said current through a closed system, applying heat to the circulating atmosphere at one point in the system, venting the said system to limit rise of pressure therein, and collecting the dried and modified starch product within the system.

7. The method of drying a starch solution and simultaneously effecting a predetermined modification thereof which consists in spraying such solution into a regulated current of superheated steam, continuously circulating said current through a closed system, applying heat to the circulating atmosphere at one point in the system, venting said system to limit rise of pressure therein, continuously separating the dried and modified starch product from the circulating atmosphere within the system and continuously removing the separated product from the system.

8. The process of inverting starch and starch products which consists in subjecting the said material to the action of an acid solution, spraying the solution carrying such products into a desiccating atmosphere of a temperature sufficiently high to volatilize the acid employed, and collecting the resultant dry acid-free product.

RICHARD W. G. STUTZKE.